Nov. 12, 1963 D. W. MYERS 3,110,504
STROLLER WITH BASE FRAME TRACK FOLDING ACTION
Filed Jan. 11, 1962 2 Sheets-Sheet 2
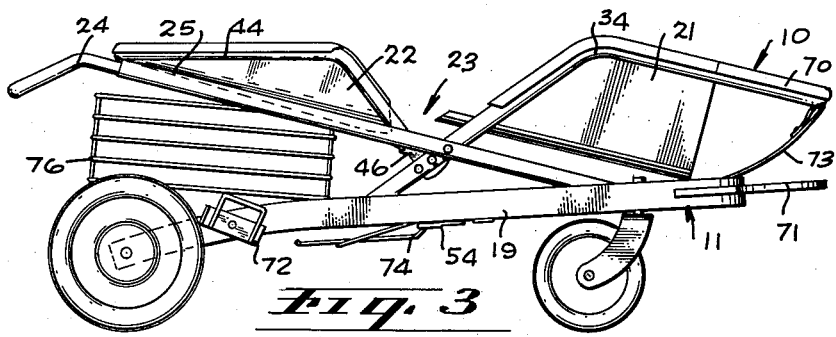
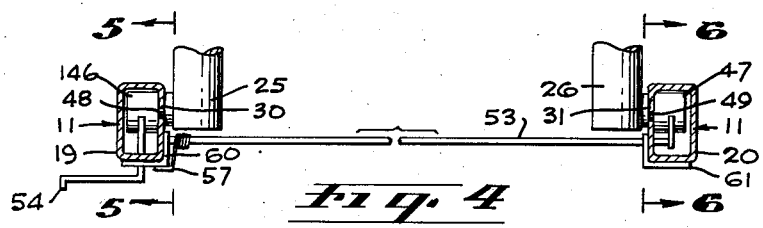
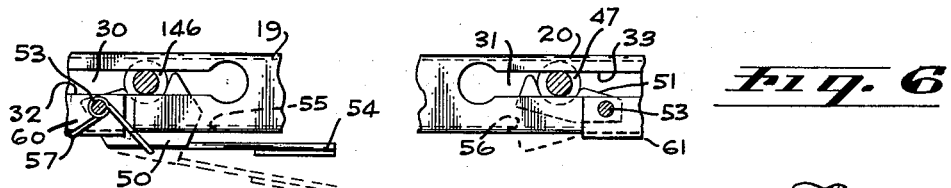
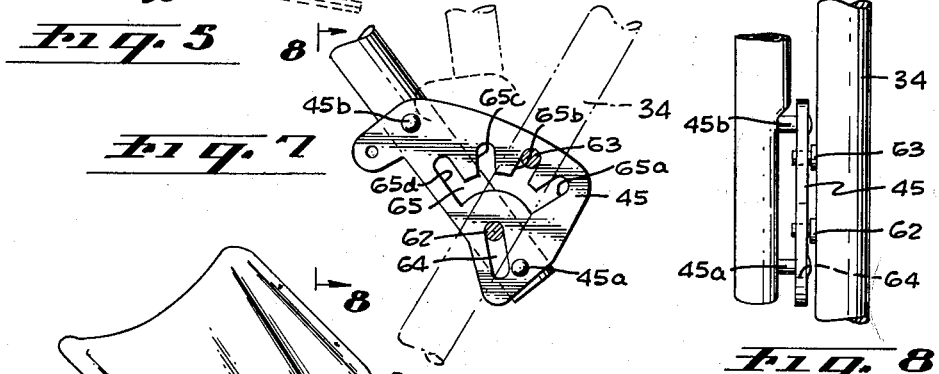
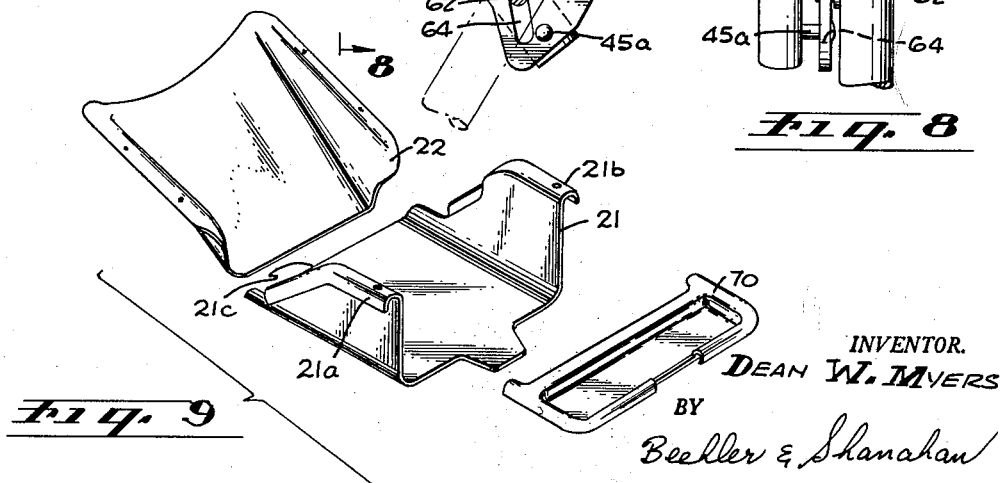
INVENTOR.
DEAN W. MYERS
BY
Beeler & Shanahan
ATTORNEYS

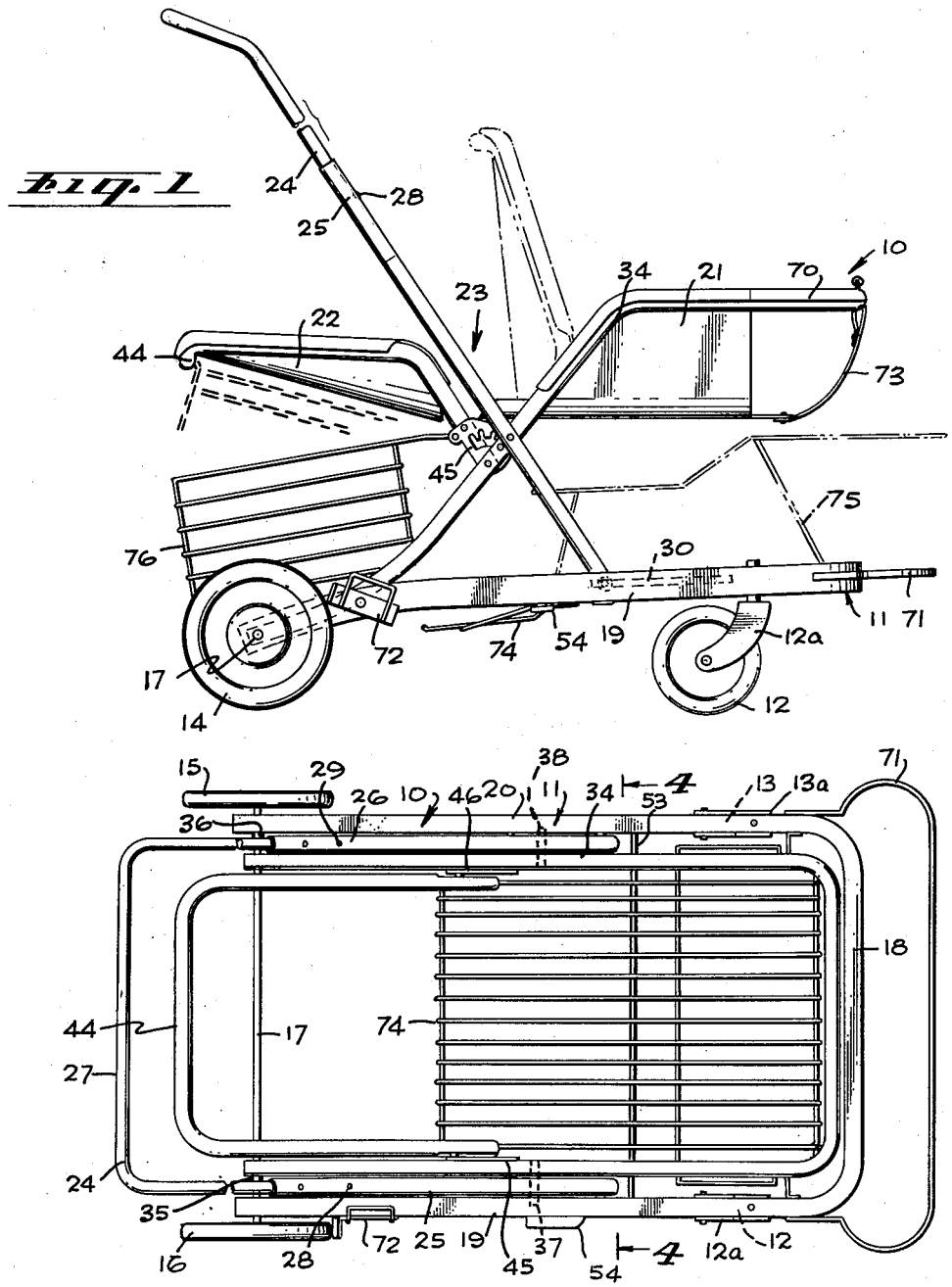

United States Patent Office 3,110,504
Patented Nov. 12, 1963

3,110,504
STROLLER WITH BASE FRAME TRACK
FOLDING ACTION
Dean W. Myers, Newport Beach, Calif., assignor, by mesne assignments, to Aeon Industries Inc., doing business as Pride Products Co., Glendale, Calif., a corporation of California
Filed Jan. 11, 1962, Ser. No. 165,702
7 Claims. (Cl. 280—36)

This invention relates generally to folding baby strollers, and more particularly to a folding baby stroller in which a base frame is provided with side tracks, and a seat support frame, hinged to the rear of the base frame, which can be lowered to folding position by forward sliding movement, in said tracks, of a handle frame. In its preferred form, the invention employs seat and back members of rigid structure, such as molded plastic or sheet metal, instead of the flexible cloth construction required in previous folding baby strollers.

The folding baby stroller has practically supplanted the baby buggy of previous generations, and has appeared in a great variety of tubular metal structures, collapsible for easy loading into an automobile, or compact storage. Substantially all of these devices have employed a base frame transported on four wheels, the front wheels being swivel mounted for easy steering. Above the base frame, a chair is provided, usually having a back which may be dropped to reclining position. The vehicle is pushed and steered from behind by a handle frame extending upward from the base frame, to which it is usually pivot mounted for purposes of folding. Wire baskets, foot rests, canopies, etc., are common to the prior art.

The present invention shares many of these general features with the prior art but departs radically from all prior art in the construction of the base frame, and the method of folding.

The novel base frame structure of the present invention makes it possible to use a rigid plastic molding for the seat of the baby stroller, in contrast to the cloth slung seat of almost all the prior art. In its preferred form, the stroller of the present invention far surpasses any prior art stroller in rigidity of structure, resistance to wear, and ease of cleaning. Since the folding construction permits the use of molded plastic seat and back components, the entire device may be quickly cleaned with soap and water, or with a garden hose, and can even be sterilized if the cloth crotch strap is removed.

The foregoing and other advantages of the invention will be understood from an examination of the accompanying drawings of one specific embodiment of the invention, and a reading of the following description thereof.

In the drawings:

FIGURE 1 is a side elevational view of a stroller constructed according to the present invention, the back being shown dropped into reclining position. FIGURE 1 also shows, in phantom line, the back in raised position, and the foot rest raised from the base frame level to an elevated position;

FIGURE 2 is a plan view of the stroller of FIGURE 1, but with the plastic seat, back, and tray removed, as well as the crotch strap, so as to show the base frame, the tubular metal structure, the wheels, and the foot support in plan view;

FIGURE 3 is a right side elevational view corresponding to FIGURE 1, but with the stroller shown collapsed into folding position;

FIGURE 4 is a transverse sectional view through the base frame at the plane indicated in FIGURE 2 by the arrows 4—4, showing the latch means employed for locking the stroller into unfolded position, or releasing it therefrom;

FIGURE 5 is a detail view of the latch mechanism in the right side of the base frame, as seen at a plane, and in the direction, indicated by the arrows 5—5 in FIGURE 4;

FIGURE 6 is a detail view of the latch mechanism in the left side of the base frame as viewed at the plane and in the direction of the arrows 6—6 in FIGURE 4;

FIGURES 7 and 8 are detail side and front elevational views, respectively, of the positioning bracket for the back rest of the stroller; and FIGURE 9 is a perspective view of the molded plastic parts of the stroller, seen disassembled from the remainder of the stroller structure.

In FIGURE 1 the stroller of the invention is identified generally by the numeral 10, and is seen to have all its principal parts assembled on to a base frame 11. The base frame 11 is supported on four rubber tired wheels as seen in FIGURES 1 and 2, two front swiveled wheels 12 and 13, and two non-swiveling rear wheels 14 and 15. Preferably, the swiveled wheels 12 and 13 are smaller in diameter than rear wheels 14 and 15 and are carried in trailing swivel mounts 12a and 13a which are rotatably mounted in frame 11 so as to swivel about vertical axes therethrough. The rear wheels 14 and 15 are mounted on a rear axle shaft 17, outboard of frame 11.

In the preferred form of frame 11, illustrated in FIGURES 1 and 2, the frame 11 is a metal tube of rectangular cross-section, as seen in FIGURE 4, bent into a U-shape, with a transverse front bar 18, and right and left side rails 19 and 20, respectively. Preferably, the side rails 19 and 20 are supported directly over the swiveling wheels 12 and 13, in their forward portion, but are bent downward toward the rear to reach and carry rear axle 17.

The base frame 11 and wheels 12 to 15 provide a rolling support for an infant's chair comprised of a seat 21 and a back 22, and the collapsible frame structure, indicated generally by the numeral 23, upon which they are mounted.

FIGURES 1 and 2 reveal that the frame structure 23 is comprised principally of three U-shaped frame members, which nest one within the other, and all three between the right and left side rails 19 and 20 of frame 11. It is comprised of an outer handle frame 24 which is comprised of tubular handle frame side members 25 and 26, and a U-shaped push handle 27, which latter is telescopically received into side members 25 and 26, and located therein by spring detent buttons 28 and 29, so as to provide a choice of two degrees of upward extension for handle 27. The side members 25 and 26 of handle frame 24 extend forwardly and downwardly to a pair of longitudinal tracks 30 and 31, best seen in FIGURES 4 and 6, which are located on the inner surfaces of base frame side rails 12 and 13. The enlarged openings at the end of the slots 32 and 33 are used to insert the followers 146 and 47 into the side rails 12 and 13. In the present preferred embodiment, tracks 30 and 31 are formed by the upper and lower walls of slots 32 and 33, although it will be obvious that a track means could be fastened to the inside surfaces of side rails 12 and 13, instead of resorting to slots therein. It will be also noted that the preferred form of rectangular cross-section for the side rails 12 and 13 provides one of its advantages for this part of the folding strolled structure since it provides a good flat surface for the location of tracks 30 and 31.

The second of the three nested frame members comprising the folding structure 23 is the U-shaped seat support frame 34, which has its two backward extending arms pivoted at their ends on rear axle 17, and which extends upward and forward to carry seat 21 in either the elevated position of FIGURE 1, when the stroller 10 is unfolded and in use, or in the lowered position of FIGURE 3 when the stroller is folded for storage.

The seat support frame 34 has its sides spaced inboard of the base frame side rails 12 and 13 by means of short spacer sleeves 35 and 36, so as to provide nesting accommodation for handle frame 24 between seat support frame 34 and said side rails 12 and 13, as seen in the plan view of FIGURE 2, thus permitting folding. The sides of seat support frame 34 are pivotally connected to the side members 25 and 26 of the handle frame 24 at pivot points 37 and 38.

The third U-shaped frame member of the structure 23 is the back support frame 44, which is shown with the back 22 mounted on it in the side view of FIGURE 1, and with the back 22 removed in the plan view of FIGURE 2. The back support frame 44 nests within seat support frame 34, and is mounted thereon by means of a pair of positioning brackets 45 and 46, which will be described hereinafter in connection with FIGURES 7 and 8.

The folding operation of the stroller is seen in FIGURE 3. When the lower ends of the handle frame side members 25 and 26 are caused to slide forward in the tracks 30 and 31, the seat support frame 34 rotates clockwise as viewed in FIGURES 1 and 3, carrying seat 21 downwards and forwards to a position close to the base frame 11, as illustrated in FIGURE 3. The nested arrangement of the frame members 24, 34, and 44, permits such folding without obstruction.

On the other hand, when it is desired to unfold the stroller from the storage position of FIGURE 3 to the unfolded position of FIGURE 1, in which the stroller is normally used, it is necessary to have a releasable latching means for holding the folding structure 23 in the unfolded position of FIGURE 1. FIGURES 4, 5, and 6 illustrated in detail the means whereby the lower ends of side members 25 and 26 are retained in the slots 32 and 33, and releasably latched, when desired, in unfolded position.

It will be seen from FIGURE 4, that the lower ends of side members 25 and 26 are provided with track follower means 146 and 47. In the particular embodiment illustrated, these are laterally projecting cylinders having annular grooves 48 and 49, respectively, which so closely receive the side walls of the base frame side members 12 and 13, as to confine the lower ends of handle frame side members 25 and 26 to their desired longitudinal track movements in tracks 30 and 31.

The cylindrical track followers 146 and 47 are locked into unfolded position by means of a pair of latches 50 and 51, inside of side rails 12 and 13 respectively. Latches 50 and 51 are integrally attached to a common hinge shaft 53, with which they can both be rotated as a single unit by means of foot pedal 54. Unlatching rotation rotates latches 50 and 51 out of engagement with follower means 146 and 47 by retracting them through slots at 55 and 56 in the undersurfaces of base frame side rails 12 and 13, respectively, as indicated in dashed outline in FIGURES 5 and 6. Unwanted rotation is resisted by a retaining spring 57.

In the particular embodiment illustrated, the hinge shaft 53 is journaled in auxiliary brackets 60 and 61 attached to the inner and undersurfaces of base frame side rails 12 and 13, respectively. These brackets 60 and 61 also provide a precise location for stopping the retraction of latch members 50 and 51.

It will be seen from the foregoing description, that the person folding the stroller can accomplish folding merely by depressing the foot pedal 54, and pushing down on the handle 27; only a light touch will be required, since gravity alone tends to pull the stroller into the folded position of FIGURE 3. This ease of folding is in contrast with most previously known strollers, which have usually required the use of both hands to accomplish folding.

FIGURES 7 and 8 illustrate how positioning brackets 45 and 46 permit the selective positioning of the back frame 44 in either the reclining position illustrated in FIGURE 1 in full line, or in the upright position illustrated in FIGURE 1 in phantom line, or in two positions intermediate the two positions illustrated. Bracket 45 is integrally attached to the lower end of back frame 44 by means of attachment pins 45a and 45b. The bracket moves with frame 44 as an integral part thereof. Bracket 45 is supported in turn on the inner side of the right side of seat support frame 34, by means of a pair of locating pins 62 and 63, seen in side view in FIGURE 8, and in section in FIGURE 7. The bracket 45, and consequently back frame 44, is shiftable with respect to seat support frame 34, since the pins 62 and 63 are received in slots 64 and 65 respectively, in bracket 45. It will be seen from FIGURE 7, that slot 65 has four radially extending branches 65a, 65b, 65c, and 65d, which will receive locating pin 63 for the positioning of the back frame 44 in any one of four different angular dispositions with respect to seat support frame 34. The seat support frame 44 is readily lifted into any one of the four positions by raising it sufficiently to bring locating pin 63 into the main arc of slot 65, to permit rotation to a new position.

The novel method of folding found in the stroller of the present invention makes it possible for the design to employ rigid components for seat and back, instead of cloth components or the like, as in most previous strollers.

FIGURE 9 shows one preferred embodiment, in which the seat 21, the back 22, and the front tray 70 are each a rigid plastic molded sheet. Each is formed to comfortably accommodate the body of a child, and at the same time to provide recesses for the reception of the tubes or bars from which the frame 23 is constructed.

The collapsible stroller of the invention is constructed to accommodate, in combination, most of the refinements found in the prior art, although not all in any one prior device. Thus, the stroller may be provided with a resilient front bumper 71, a safety brake 72, for locking the rear wheel 14 during unattended parking of the stroller, a crotch strap 73 for retaining an infant in the seat 21, and a wire foot rest 74, seen in the plan view of FIGURE 2. Foot rest 74 may be retracted into a lowered position as seen in FIGURES 1, 2, and 3, in full line, or raised to an elevated position for a reclining infant, as seen in the phantom lines in FIGURE 1 at 75.

The stroller of the invention also includes a wire basket 76 which is hinged at each side to the back frame 44 (or to its integral parts positioning brackets 45 and 46), so that it can be lowered into the position seen in full line in FIGURE 1, or raised and hooked to back frame 44 as shown in phantom line in FIGURE 1.

In the preferred form of the invention shown in the specific embodiment illustrated, it will be seen from FIGURE 1, that the track 30 extends from a point just behind the swivel 12A to a point under the seat 21 but forward of the transverse line of pivots 37 and 38. The extension of the track 30 (and its corresponding opposite track 31) between these two points permits maximum folding when handle frame 24 is lowered, and maximum rigidity when handle frame 24 is raised. Also, the seat support frame 34 is hinged as far back in the base frame 11 as possible, preferably on the rear wheel axis 17 and is pivoted to the handle frame 24 at 37, at a crossing point which is about mid-way between the front and rear wheels, somewhat to the rear of the most rearward ends of tracks 30 and 31, and slightly below seat 21, to provide a structure with a low center of gravity.

Another preferred feature is that the holding frame is entirely inboard of the base frame, and the latches 50 and 51 are enclosed within base frame side rails 12 and 13, to minimize any risk of engaging nearby objects.

Still another feature of the preferred form shown is that the back 22 actually nests forward between the arm supports 21a and 21b, when raised to the upright position illustrated in phantom line in FIGURE 1. The consequence of this nesting construction is that an uniquely long bed length is produced when the back 22 is lowered as in FIGURE 1, and the rearwardly projecting portion 21c (see FIGURE 9) of seat 21 becomes part of the support of the child occupant when in a reclining position.

It will be apparent also that elimination of the conventional foot rest 75 will permit the rigid seat 21 to nest down between side rails 12 and 13 when the stroller 10 is folded.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having thus described the invention, what is claimed as new in support of Letters Patent is:

1. An improved baby stroller which includes: a base frame having tubular side members each of said side members having a substantially horizontal longitudinal slot in its inner wall near the forward end of said stroller, providing a track; wheels mounted on said base frame to provide it with rolling transport means; a seat support frame having side members hinged to said base frame near the rear end thereof; a handle for pushing said stroller, said handle being comprised of a U-shaped structure having side bars extending from forward fulcrum ends toward the rear of said stroller, said fulcrum ends being pivotally mounted in said tracks and movable therein longitudinally with respect to said stroller, between a forward position for collapsing said stroller and rearward retracted position for unfolding said stroller; a pair of track follower means, one on the fulcrum end of each of said handle bars, each said follower member being movable in the interior of one of said tubular side members along said longitudinal slot therein; a pair of pivotal connections between said handle side bars and the sides of seat support frame to provide means for lifting said seat frame from folded to unfolded position when said handle side bars are moved to unfolded position with said fulcrum ends retracted in said tracks; and resiliently resistant latch means movable in the interior of said tubular side members for releasably retaining at least one of said track follower means at the rearward end of one of said longitudinal slots.

2. An improved baby stroller which includes: a base frame having tubular side members each of said side members having a substantially horizontal longitudinal slot in its inner wall near the forward end of said stroller; wheels mounted on said base frame to provide it with rolling transport means; a seat support frame having side members hinged to said base frame near the rear end thereof; a back member hinged to the side members of said seat support member and nested therebetween; multiple stop means connecting said back support and said side bars and adapted to position said back support in positions for seating and reclining positions; a handle for pushing said stroller, said handle being comprised of a U-shaped structure having side bars extending from forward fulcrum ends toward the rear of said stroller, a pair of track follower means, one on the fulcrum end of each of said handle side bars, each said follower member being movable in the interior of one of said tubular side members along said longitudinal slot therein; said fulcrum ends being pivotally mounted in said slots and movable therein longitudinally with respect to said stroller, between a forward position for collapsing said stroller and rearward retracted position for unfolding said stroller; a pair of pivotal connections between said handle side bars and the sides of said seat support frame to provide means for lifting said seat frame from folded to unfolded position when said handle side bars are moved to unfolded position with said fulcrum ends retracted in said tracks; and resiliently resistant latch means movable in the interior of at least one of said track follower means for releasably retaining one of said follower means at the rearward end of one of said longitudinal slots.

3. An improved baby stroller which includes: a base frame having tubular side rails; a pair of swiveled front wheels mounted on the forward end of said base frame; a rear axle transversely disposed in said base frame at the rear end thereof; a pair of rear wheels outboard of said base frame, and rotatably mounted on said rear axle; a seat comprised of a seat structure supported in a seat support frame rotatably mounted on said rear axle, said seat support frame extending forward therefrom and rotatable from a collapsed position adjacent the forward end of said base frame and an elevated position spaced above said base frame, said seat support frame having substantially smaller width than the width of the space between said side rails of said base frame; spacer means on said rear axle between said seat support frame and said base frame; walls in said side rails of said base frame defining a pair of slotted tracks, one on the inner surface of each of said side rails, near the forward ends thereof; a handle frame including a pair of handle frame side members, said handle frame being movable between a collapsed position with said side members nested between the sides of said seat frame and said side rails, and extending from the forward ends of said tracks to the rear of said stroller, and an elevated position with the rearward part of said handle frame raised from its collapsed position and the forward ends of said side members rearwardly retracted along said tracks; a pair of pivot means pivotally connecting the sides of said seat support frame and said handle frame side members at a transverse axis between their respective folding axes whereby elevation of said handle frame lifts said seat support frame to its elevated position; a pair of track followers, one at the lower end of each of said handle frame side members, for movably retaining the forward ends of said handle frame in said tracks while permitting movement of said forward ends between a forward collapsed position and a rearward elevated position; a latch hinge shaft extending transversely across said base frame and journaled in said side rails near the rearward position of said track followers; a latch member mounted on each end of said latch hinge shaft, and integral therewith, and rotatable with said shaft to engage said track followers; a spring means urging said latch into locking rotation; and foot pedal means for rotating said latch hinge shaft in an unlatching direction.

4. An improved baby stroller which includes: a base frame having tubular side rails of rectangular cross-section, said base frame having a relatively elevated forward end, and descending toward the rear to a relatively low rear end; a pair of swiveled front wheels mounted under the forward end of said base frame, and having swivel shafts passing upwardly from said wheels through said base frame side rails; a rear axle transversely disposed in said base frame at said relatively lower rear end thereof; a pair of rear wheels outboard of said base frame, and rotatably mounted on said rear axle; a seat comprised of a seat structure supported in a seat support frame rotatably mounted on said rear axle, said seat support frame extending forward therefrom and rotatable from a collapsed position adjacent the forward end of said base frame and an elevated position spaced above said base frame, said seat support frame having substantially smaller width than the width of the space between said side rails of said base frame; spacer means on said rear axle between said seat support frame and said base frame; walls in said side rails of said base frame defining a pair of slotted tracks, one on the inner surface of each of said side rails, said tracks extending backward from said swivel shafts;

a handle frame including a pair of handle frame side members, said handle frame being movable between a collapsed position with said side members nested between the sides of said seat frame and said side rails, and extending from the forward ends of said tracks to the rear of said stroller, and an elevated position with the rearward part of said handle frame raised from its collapsed position and the forward ends of said side members rearwardly retracted along said tracks; a pair of pivot means pivotally connecting the sides of said seat support frame and said handle frame side members at a transverse axis between their respective folding axes whereby elevation of said handle frame lifts said seat support frame to its elevated position; a pair of track followers, one at the lower end of each of said handle frame side members, for movably retaining the forward ends of said handle frame in said tracks while permitting movement of said forward ends between a forward collapsed position and a rearward elevated position; a latch hinge shaft extending transversely across said base frame and journaled in said side rails near the rearward position of said track followers; a latch member mounted on each end of said latch hinge shaft, and integral therewith, and rotatable with said shaft to engage said track followers within said side rails; a spring means urging said latch into locking rotation; and foot pedal means for rotating said latch hinge shaft in an unlatching direction.

5. An improved baby stroller which includes: a base frame having tubular side rails of rectangular cross-section, said base frame having a relatively elevated forward end, and descending toward the rear to a relatively low rear end; a pair of swiveled front wheels mounted under the forward end of said base frame, and having swivel shafts passing upwardly from said wheels through said base frame side rails; a rear axle transversely disposed in said base frame at said relatively lower rear end thereof; a pair of rear wheels outboard of said base frame, and rotatably mounted on said rear axle; a seat support frame rotatably mounted on said rear axle, and extending forward therefrom and rotatable from a collapsed position adjacent the forward end of said base frame and an elevated position spaced above said base frame, said seat support frame having substantially smaller width than the width of the space between said side rails of said base frame; spacer means on said rear axle between said seat support frame and said base frame; walls in said side rails of said base frame defining a pair of slotted tracks, one on the inner surface of each of said side rails, said tracks extending backward from said swivel shafts; a handle frame including a pair of handle frame side members, said handle frame being movable between a collapsed position with said side members nested between the sides of said seat frame and said side rails, and extending from the forward ends of said tracks to the rear of said stroller, and an elevated position with the rearward part of said handle frame raised from its collapsed position and the forward ends of said side members rearwardly retracted along said tracks; a pair of pivot means pivotally connecting the sides of said seat support frame and said handle frame side members at a transverse axis rearward of the retracted position of said forward ends of said handle frame side members, whereby elevation of said handle frame lifts said seat support frame to its elevated position; a pair of track followers, one at the lower end of each of said handle frame side members, for movably retaining the forward ends of said handle frame in said tracks while permitting movement of said forward ends between a forward collapsed position and a rearward elevated position; a latch hinge shaft extending transversely across said base frame and journaled in said side rails near the rearward position of said track followers; a latch member mounted on each end of said latch hinge shaft, and integral therewith, and rotatable with said shaft to engage said track followers within said side rails; a spring means urging said latch into locking rotation; foot pedal means for rotating said latch hinge shaft in an unlatching direction; a rigid seat structure carried integrally with said seat support frame and nestable within the forward part of said base frame, said seat structure including an extension rearward of said seat frame; a back frame nested between the sides of said seat support frame and hingeably attached to said sides near the rear of said rigid seat structure; a seat back carried on said back frame; and positioning bracket means between said back frame and said seat support frame for selectively positioning said back frame between an upright position with said back substantially forward of said rearward extension of said seat, and a reclining position with said back extending substantially horizontally and rearward from said rear extension.

6. An improved baby stroller which includes: a base frame having tubular side rails of rectangular cross section; wheels rotatably mounted to said base frame to provide it with rolling support means; a seat support frame hingeably mounted to the rear of said base frame, and adapted to swing from a raised, unfolded position, spaced above said base frame, to a lowered folded position, adjacent the forward end of said base frame, said seat support frame having substantially smaller width than the width of the space between said side rails of said base frame; walls in said side rails of said base frame defining a pair of slotted tracks, one on the inner surface of each of said side rails, near the forward ends thereof; a handle frame including a pair of handle frame side members, said handle frame being movable between a collapsed position with said side members nested between the sides of said seat frame and said side rails, and extending from the forward ends of said tracks to the rear of said stroller, and an elevated position with the rearward part of said handle frame raised from its collapsed position and the forward ends of said side members rearwardly retracted along said tracks; a pair of pivot means pivotally connecting the sides of said seat support frame and said handle frame side members at a transverse axis between their respective folding axes, whereby elevation of said handle frame with said seat structure to its elevated position; a pair of track followers, one at the lower end of each of said handle frame side members, each being enclosed within one of said rectangular side rails and longitudinally movable within said side rail along said slot; a latch hinge shaft extending transversely across said base frame and journaled in said side rails near the rearward position of said track followers; and a pair of latch means integrally mounted to rotate with said latch hinge shaft, each of said latch means being disposed to rotate in a vertical plane upwardly through a slot in the underside of one of said side rails to the interior of said side rail to engage one of said track followers and retain it in unfolded position.

7. An improved baby stroller which includes: a base frame having tubular side rails of rectangular cross section; wheels rotatably mounted to said base frame to provide it with rolling support means; a seat support frame hingeably mounted to the rear of said base frame, and adapted to swing from a raised, unfolded position, spaced above said base frame, to a lowered folded position, adjacent the forward end of said base frame, said seat support frame having substantially smaller width that the width of the space between said side rails of said base frame; walls in said side rails of said base frame defining a pair of slotted tracks, one of the inner surface of each of said side rails, near the forward ends thereof; a handle frame including a pair of handle frame side members, said handle frame being movable between a collapsed position with said side members nested between the sides of said seat frame and said side rails, and extending from the forward ends of said tracks to the rear of said stroller, and an elevated position with the rearward part of said handle frame raised from its collapsed position and the forward ends of said side members rearwardly retracted along said tracks; a pair of pivot means pivotally connecting the sides of said seat support frame and said handle frame side members at a transverse axis between their respective folding axes, whereby elevation of said handle frame with said seat structure to its elevated position; a pair of track followers, one at the lower end of each of said handle frame side members, each being enclosed within one of said rectangular side rails and longitudinally movable within said side rail along said slot; a latch hinge shaft extending transversely across said base frame and journaled in said side rails near the rearward position of said track followers; and a pair of latch means integrally mounted to rotate with said latch hinge shaft, each of said latch means being disposed to rotate in a vertical plane upwardly through a slot in the underside of one of said side rails to the interior of said side rail to engage one of said track followers and retain it in unfolded position; a rigid seat structure carried integrally with said seat support frame and nestable within the forward part of said base frame, said seat structure including an extension rearward of said seat frame; a back frame nested between the sides of said seat support frame and hingeably attached to said sides near the rear of said rigid seat structure; a seat back carried on said back frame; and positioning bracket means between said back frame and said seat support frame for selectively positioning said back frame between an upright position with said back substantially forward of said rearward extension of said seat, and a reclining position with said back extending substantially horizontally and rearward from said rear extension.

References Cited in the file of this patent
UNITED STATES PATENTS

| | | |
|---|---|---|
| 2,713,494 | Bailey | July 19, 1955 |
| 2,880,011 | Peterson | Mar. 31, 1959 |
| 2,886,337 | Quisenberry | May 12, 1959 |